July 24, 1934. A. G. LEAKE 1,967,828
REENFORCEMENT FOR PIN CONNECTED BRIDGE TRUSSES
Filed Sept. 23, 1932 8 Sheets-Sheet 1
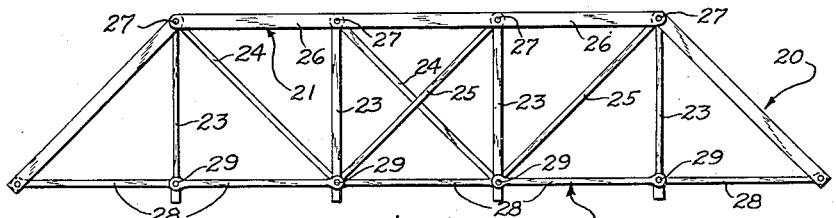
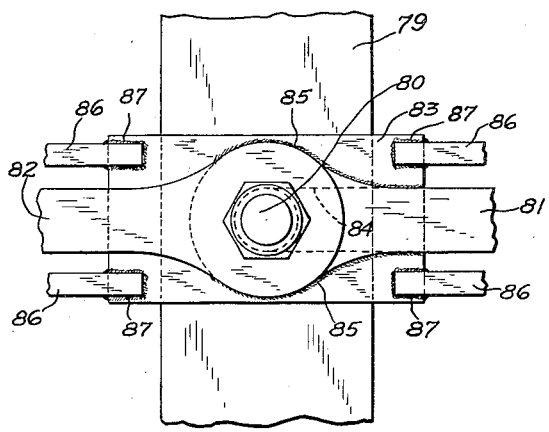
Fig. 26
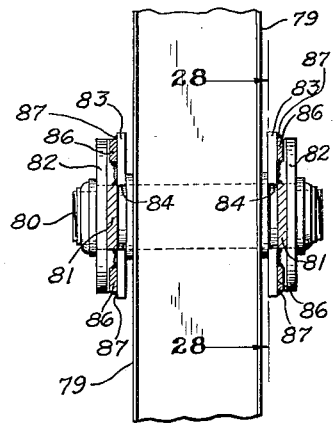
Fig. 27
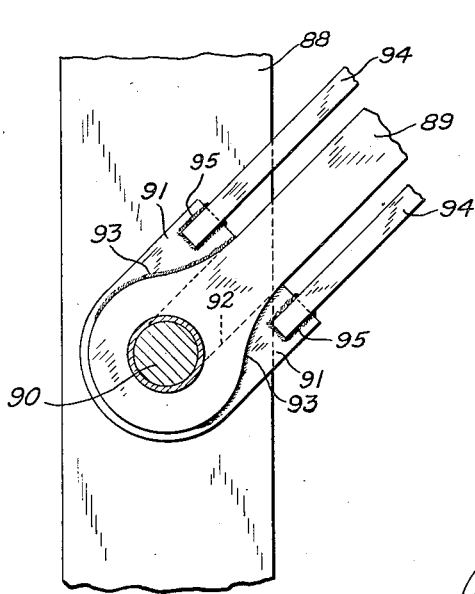
Fig. 29
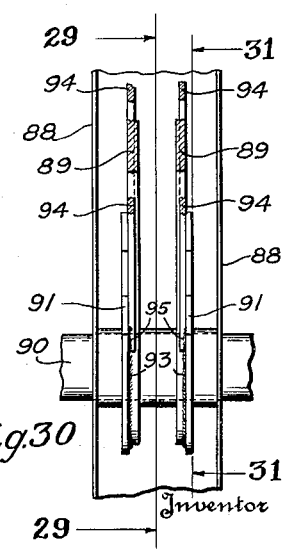
Fig. 30
Inventor
Arthur G. Leake
By Wooster & Davis
Attorneys July 24, 1934.   A. G. LEAKE   1,967,828
REENFORCEMENT FOR PIN CONNECTED BRIDGE TRUSSES
Filed Sept. 23, 1932   8 Sheets-Sheet 2

Inventor
Arthur G. Leake
By Wooster & Davis
Attorneys

July 24, 1934.  A. G. LEAKE  1,967,828
REENFORCEMENT FOR PIN CONNECTED BRIDGE TRUSSES
Filed Sept. 23, 1932   8 Sheets-Sheet 3
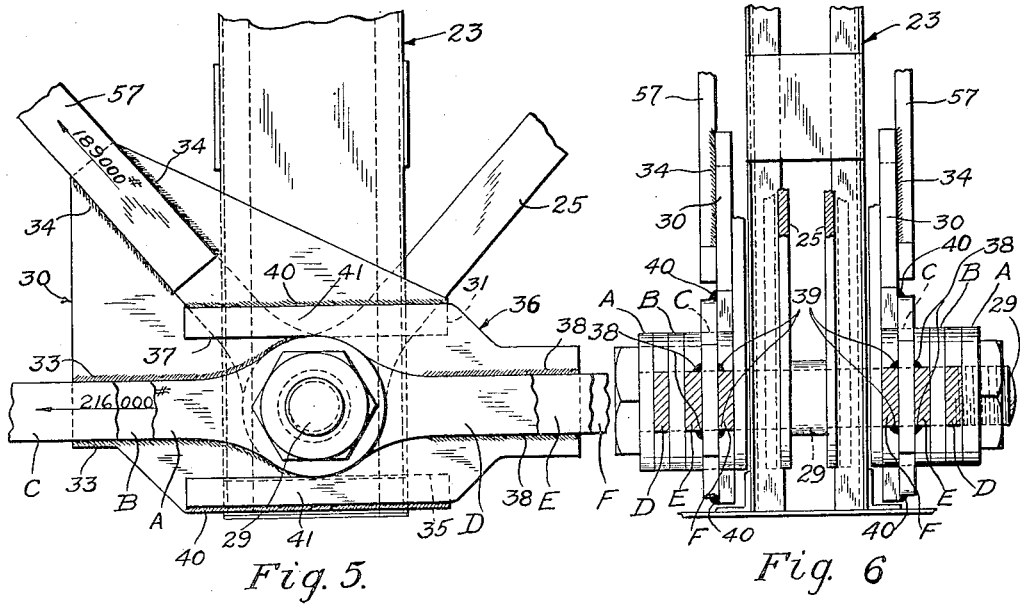
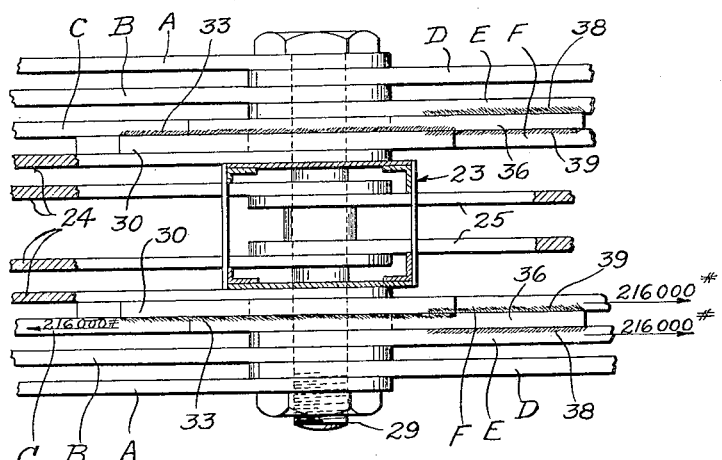
Inventor
Arthur G. Leake
By Wooster & Davis
Attorneys July 24, 1934.  A. G. LEAKE  1,967,828
REENFORCEMENT FOR PIN CONNECTED BRIDGE TRUSSES
Filed Sept. 23, 1932   8 Sheets-Sheet 4

Inventor
Arthur G. Leake
By Wooster & Davis
Attorneys

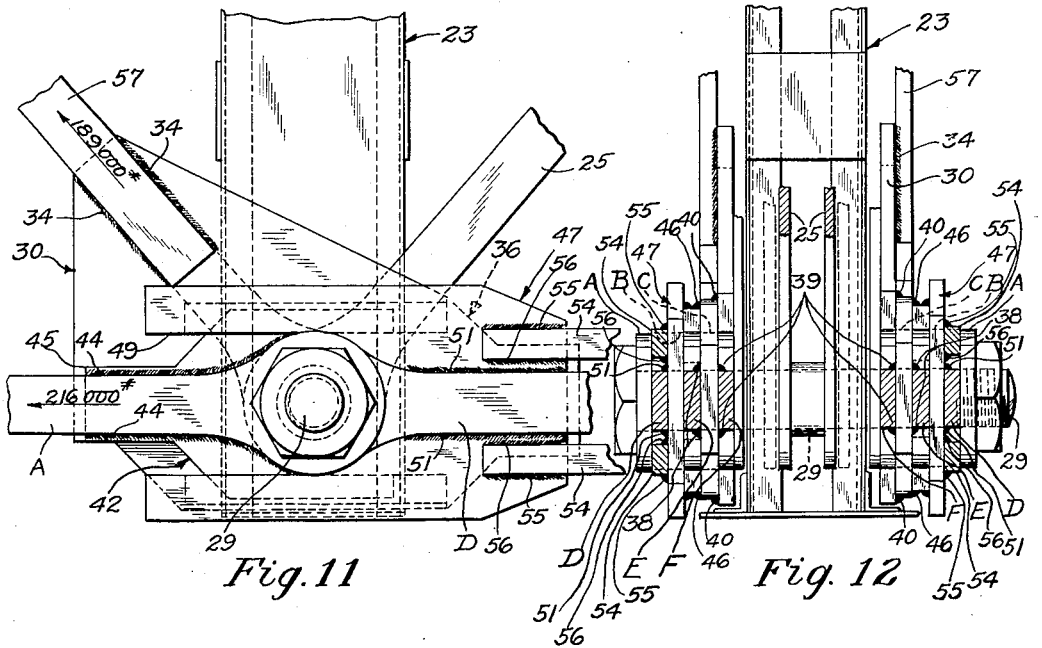
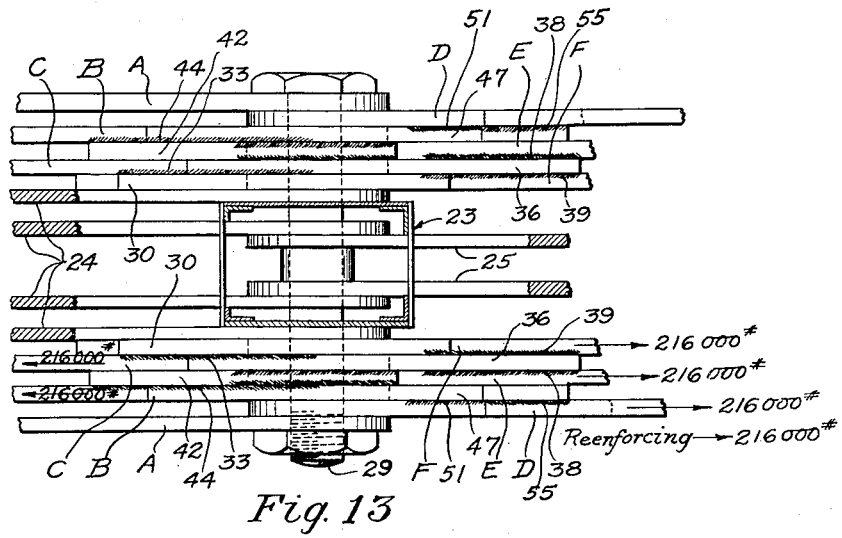

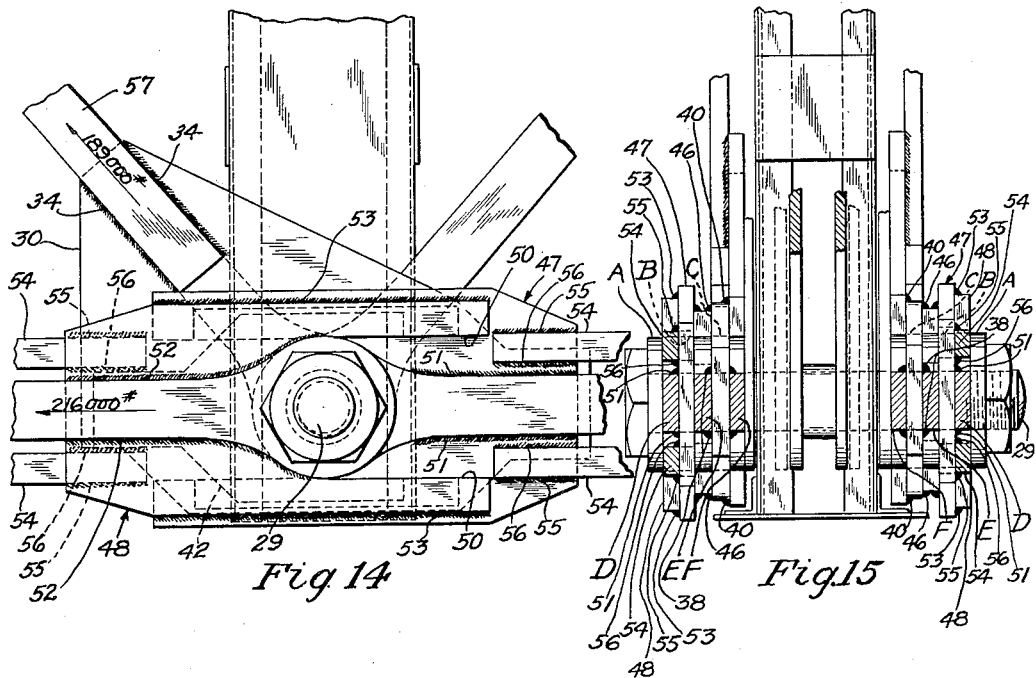

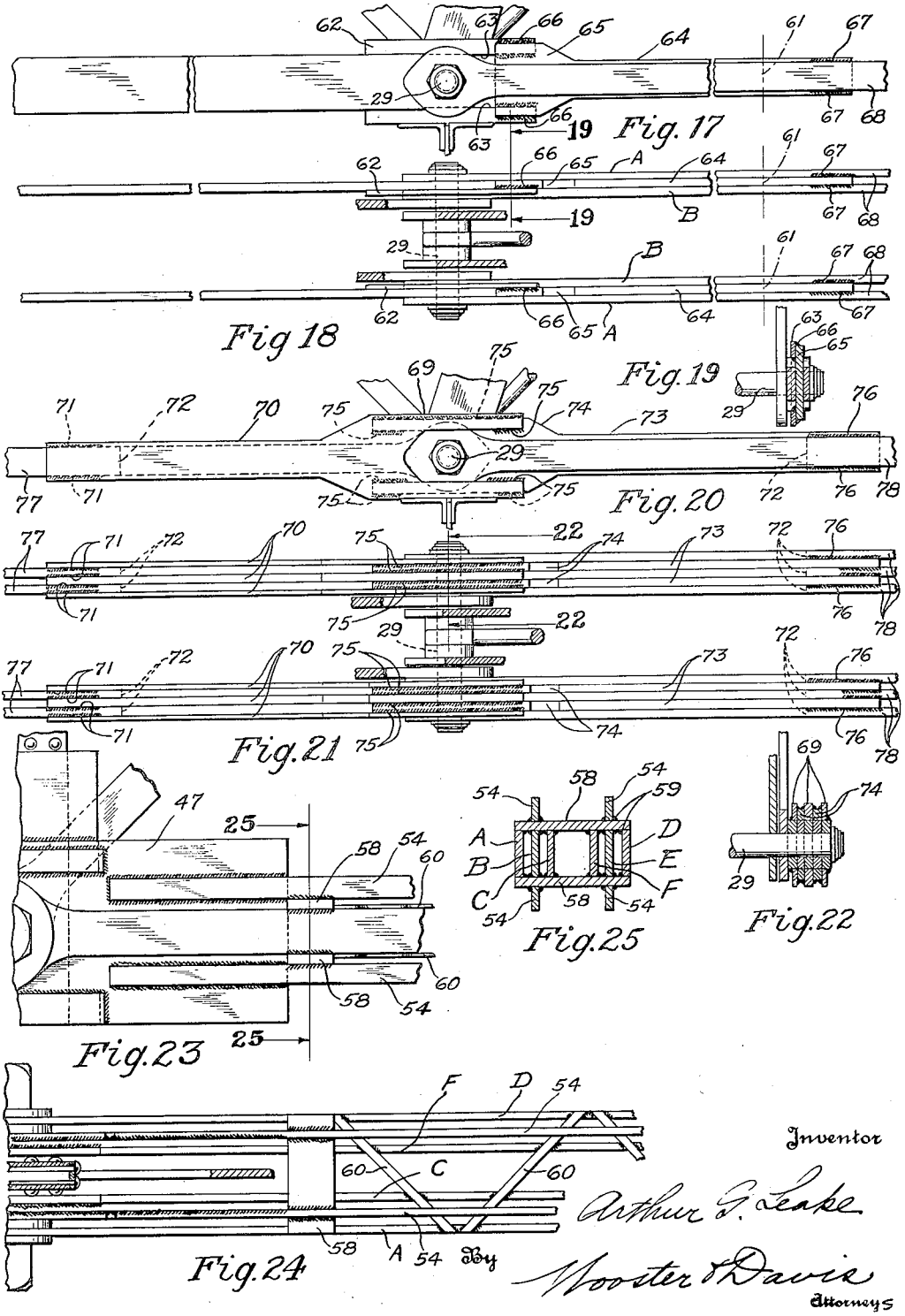

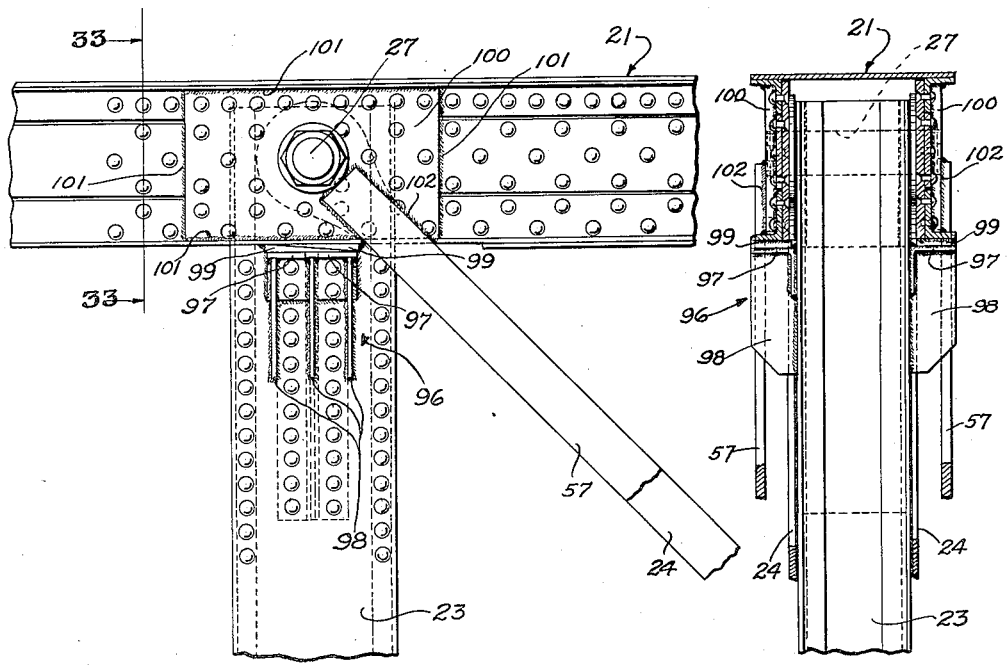
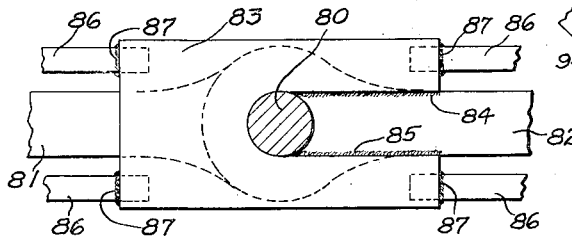
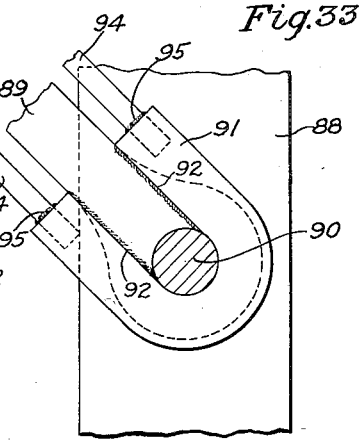

Patented July 24, 1934

1,967,828

UNITED STATES PATENT OFFICE 1,967,828

REENFORCEMENT FOR PIN CONNECTED BRIDGE TRUSSES

Arthur G. Leake, Bridgeport, Conn.

Application September 23, 1932, Serial No. 634,503

22 Claims. (Cl. 29—151)

This invention relates to new and useful improvements in and methods of reenforcing or strengthening pin connected bridge trusses or the like.

The invention has for an object to provide a simple and comparatively inexpensive method of reenforcing or strengthening pin connected bridge trusses or similar structures whereby bridges or other structures including such trusses may be strengthened for use for carrying such heavier loads than those for which the bridges were originally designed.

An additional object is to provide a method and means whereby bridges or similar structures using pin and eyebar construction, which has become deteriorated by rust or corrosion, can be returned to full strength, or even greater strength than when originally constructed.

Another object is to provide a method as stated and which does not require the building of false work to carry the joints, and does not involve the building of a temporary truss or temporary trusses to support the load while the work of reenforcing the bridge is being done, and the work can be done without any delay to traffic.

A further object is to provide a method whereby all stresses in the bottom chord of bridges or other similar structures including pin connected trusses are transferred from one eye-bar to the next independent of the pivots or pins connecting the eye-bars.

Another object is to provide a method of strengthening or reenforcing a bridge and which method may include the step of strengthening or adding additional diagonal bars, said bars at their upper ends being connected with the top chord of the bridge independent of any connecting pins therein, and with the bottom bridge chord independent of its usual connecting pins.

Other objects and advantages will become apparent from a consideration of the following detailed description, taken in connection with the accompanying drawings, wherein a satisfactory embodiment of the invention is shown. However, it will be understood that the invention is not limited to the details disclosed, but includes all such variations and modifications as fall within the spirit of the invention, and the scope of the appended claims.

In the drawings:

Fig. 1 is a side elevational view illustrating an eye-bar bridge to be reenforced or strengthened by the method of the present invention;

Fig. 5 is a view similar to Fig. 2 showing the second step in the reenforcing of the bottom chord;

Fig. 6 is a view looking from the right of Fig. 5;

Fig. 7 is a plan view looking toward the bottom of Fig. 5;

Fig. 11 is a side elevation similar to Figs. 2, 5 and 8 showing the next step in the method;

Fig. 12 is a view looking from the right of Fig. 11;

Fig. 13 is a view looking toward the bottom of Fig. 11;

Fig. 14 is a side elevation showing the last steps in reenforcing the joint;

Fig. 15 is a view looking from the right of Fig. 14;

Fig. 16 is a view looking toward the bottom of Fig. 14

Fig. 17 is a side elevation of a joint showing a somewhat different arrangement such as may be used where the end portions of the eye-bars are badly corroded;

Fig. 18 is a bottom plan view of Fig. 17;

Fig. 19 is a detailed section on line 19—19 of Fig. 18;

Fig. 20 is a side elevation showing a further use of an arrangement similar to Fig. 17;

Fig. 21 is a bottom plan view thereof;

Fig. 22 is a detailed section on line 22—22 of Fig. 21;

Fig. 23 is a side elevation of a reenforced joint illustrating how the eye-bars may be tied together;

Fig. 24 is a bottom plan view thereof;

Fig. 25 is a detailed section on line 25—25 of Fig. 23;

Fig. 26 is a detail elevational view at the connection between a pair of the eye-bars of the bottom chord of the bridge illustrating a slightly modified arrangement;

Fig. 27 is an end view of the parts shown in Fig. 26;

Fig. 28 is a sectional view taken substantially along the line 28—28 of Fig. 27;

Fig. 29 is a detail elevational view at the lower end of the diagonal eye-bars, the view being taken substantially along the line 29—29 of Fig. 30;

Fig. 30 is an end view looking from the right in Fig. 29;

Fig. 31 is a view taken substantially along the line 31—31 of Fig. 30;

Fig. 32 is a side elevational view illustrating the reenforcement of the top chord of a bridge by the method of the present invention; and Fig. 33 is a sectional view taken substantially along the line 33—33 of Fig. 32.

Figure 2:
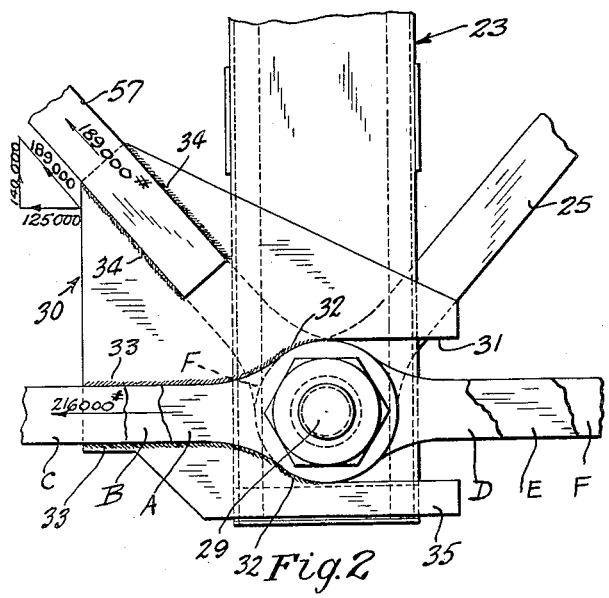
Fig. 2 is an elevational view on a larger scale showing the first step in reenforcement of the bottom chord of bridge about one of the connecting pins or joints according to the present invention.

Referring in detail to the drawings, the first particularly to Fig. 1, in that figure is shown an eye-bar bridge, that being the particular type of bridge to which this invention relates. The bridge as here disclosed is generally designated 20 and includes a top chord 21, a bottom chord 22, vertical struts 23, and diagonal eye-bars 24. At 25 are disclosed other diagonal eye-bars commonly known as counters, and which at certain times serve to relieve the diagonal bars 24 of stress. The upper chord 21 includes bars 26, connected as by pins 27, while the lower chord comprises eye-bars 28, pivotally connected by pins 29.

At the present time there are a large number of pin connected bridges used along railroad rights of way and which bridges were built at a time when railroad equipment was much lighter than at the present. These bridges were built when an engine loading of Cooper's E40 was considered heavy. Now most railroads are using much heavier equipment and engine loadings of Cooper's E60 are fifty per cent heavier than the bridges were designed to carry. The eye-bars and other members at the pin connections have also in a great many cases deteriorated so that they are not as strong as when originally built.

To avoid the necessity and resulting expense of renewing such bridges the railroads have for some time sought a means of economically reenforcing the bridges. Different methods have been suggested and tried, but have proved expensive and have therefore not met the necessary requirements. Where the bearing value of the connecting pins 29 has been the limiting features it has occasionally been possible to remove the pin, ream the pin hole through the eye-bars and put in a new pin. This requires a system of temporary truss members or false work under the bridge to carry the joints while work is being done and is always costly. In my method this is not necessary.

Referring now particularly to Figs. 2 through 20 of the drawings, it will be noted that according to the present invention the bridge is built up or strengthened about each of the connecting pins 29. The method is such that when the bridge has been strengthened or reenforced the load is transferred from one or all of the eye-bars of one section of the lower chord of the bridge to the eye-bar or bars thereof in the adjacent section substantially independently of the connecting pin.

In the bridge illustrated the bottom chord consists of six eye-bars arranged in two sets of three each on opposite sides of the strut or column 23. The eye-bars may, of course, be any size but if they are 6" x 2" and a reenforcement of 33% is required then an additional section of 24 square inches is required to be added. For convenience I have designated the outer of the three bars to the left of pin 29 as (A), the intermediate or middle bar (B) and the inner bar (C). The corresponding bars to the right of the pin are designated (D), (E) and (F). It will, of course, be understood this method is not limited to a bridge construction using six eye-bars on each side of the pin but may be used in any of this type of construction regardless of the number of bars.

In the construction illustrated there are also four diagonal bars 24 and 25, 6" x 2", and therefore if the reenforcing required for the diagonals is 40 percent, then the additional cross-sectional area of the added diagonal bars must be 21 square inches. The bearing of the eye-bars on the pin 29 is bad and not sufficient to carry the load, and it is therefore required to relieve the bearing on the pin as much as possible.

For purposes of illustration I am assuming the unit stresses in tension in the eye-bars and reenforcing materials, as 18,000 pounds per square inch. Also the unit safe strength for a ¾ inch fillet weld is taken as 6,000 pounds per linear inch.

Figure 3:
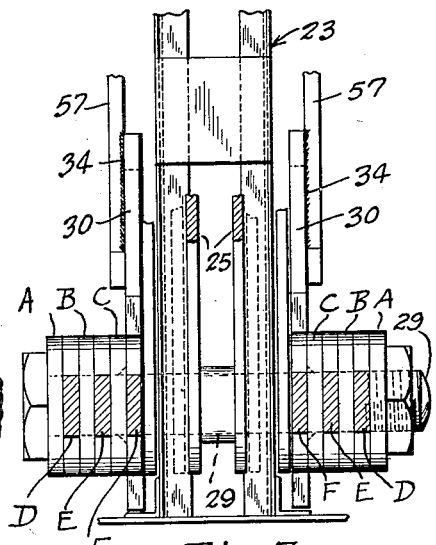
Fig. 3 is a view looking from the right of Fig. 2.
Figure 4:
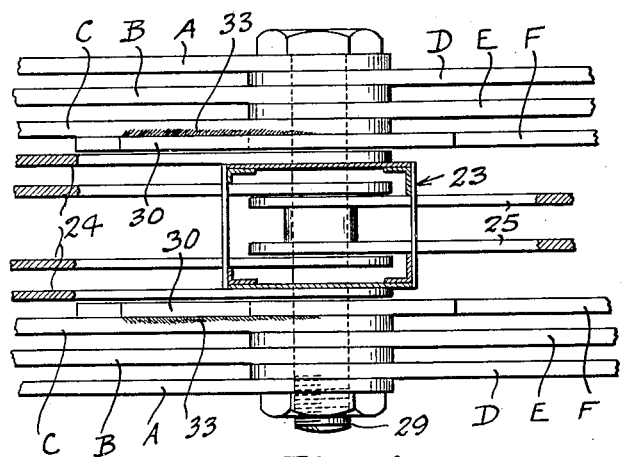
Fig. 4 is a plan view looking toward the bottom of Fig. 2.

Referring now to Figs. 2, 3 and 4 illustrating the first step in the reenforcement of the joint and the bottom chord, a plate 30 of the same thickness as the eye-bar (F) (in the present instance 2 inches as indicated above), is cut out from one edge, as indicated at 31, to fit over the head or enlargement of the eye-bar (F), as indicated in Figs. 2 and 4. This plate may be welded to the head of the eye-bar (F) as far as possible, as indicated at 32, and it is also welded to the eye-bar (C), as indicated at 33. As the stress in eye-bar (C) has been assumed at 216,000 pounds, (6x2x18,000) then this bar should be welded to plate 30 with a minimum of 36 linear inches of ¾ inch fillet weld. It is better, however, to use about 40 linear inches to take care of any unequal stress from the diagonal bar indicated at 57, which is added later as will be described in due course. This will indicate the required size of the plate 30, or that is, its extent to the left of the pin 29, and it will be evident that as soon as the eye-bar (C) and the plate 30 are welded together they act as a unit.

In these figures additional diagonals 57 are shown welded to the plate 30 at 34, but this is merely shown here to assist in determining the size of plate 30, as it is to be understood that these diagonals 57 are not to be welded to the plates until the strengthening of the bottom chord has been completed. As the assumed stress of the bar 57 is 189,000 pounds, the plate 30 is made large enough to accommodate 16 linear inches of welding 34 on each side of the bar. This will give a strength somewhat over 189,000 pounds for safety. The bottom portion 35 of plate 30 under the head of the eye-bar (F) is approximately 7½ square inches. This is somewhat larger than the 3 square inches needed at this point to take the required stress, but the plate is made this much larger to facilitate welding to the next plate, which will soon be described. As indicated above, it will now be evident that the bar (C) and the plate 30 act as a unit.

Referring now to Figs. 5, 6 and 7, these figures illustrate the second step in the reenforcing of the bottom chord. In this step a plate 36 of the same thickness as the eye-bar (C) is cut out from one edge as indicated at 37 to fit over the head of this eye-bar (C). It will be noted that this plate is now between the eye-bars (E) and (F) and lies in contact with them, or that is, it fills the space between them. It is now welded to the plate (E) on one side, as indicated at 38, and to the plate (F) on the other side, as indicated at 39. As we have assumed the stress in both bars (E) and (F) to be 216,000 pounds, each bar is welded to the plate 36 by 18 linear inches of ¾ inch fillet weld on each edge. This will give an indication of the length of plate 36 required, but as the stress in this plate is 432,000 pounds, it will require a net cross-sectional area of 24 square inches, or that is, its cross-section will be 12 inches by 2 inches.

Because the eye-bar (C) and plate 30 form one unit and the eye-bar (F) and plate 36 form another unit, then by welding plates 30 and 36 together with sufficient welding to develop a strength of 216,000 pounds, it will theoretically be possible to transfer the stress in eye-bar (C) through plates 30 and 36 to eye-bar (F), and thereby relieve pin 29 from any stress from these bars. In practice, however, this is not possible as the pins 29 will always carry the dead load stresses and any unbalanced stresses at the joints, but as these are always a small part of the total stresses from dead load, live loads, and impact, the bearing on the pin will be of small importance. In Fig. 5 the plates 30 and 36 are shown as welded together, as indicated at 40, with a total of 58 inches of ¾ inch fillet weld. This is done to take care of the 216,000 pounds from the eye-bar (C) and also the horizontal component of 125,000 pounds from the diagonal stress of 189,000 pounds from the diagonal bar 57, which is to be later added. In the construction shown the net area of the two end portions 41 of plate 36 at the center of pins 29 is approximately 2 x 3 x 2 inches giving 12 square inches, which has a safe strength of 216,000 pounds. This is sufficient because half of the stress of 432,000 pounds is already transferred to plates 30 and 36 by the welding laterally of the center line.

It will be seen that the welding 38 and 39 between the plate 36 and the eye-bars (E) and (F) is shown as stopped-off before reaching the swelling at the heads of the eye-bars. This is because of the small working space available.

Figure 8:
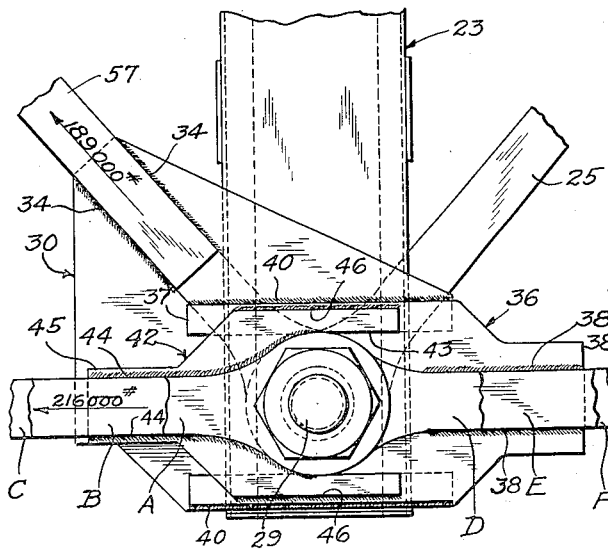
Fig. 8 is a view similar to Figs. 2 and 5 illustrating a further step in the method.
Figure 9:
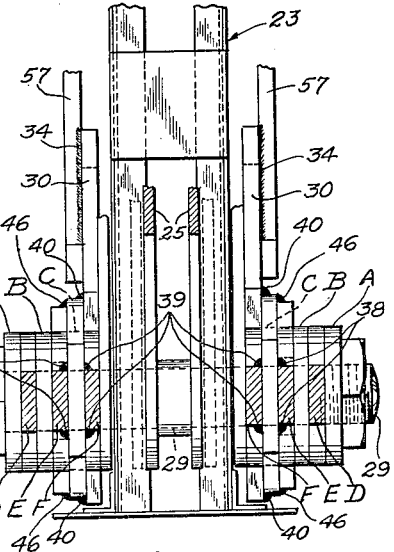
Fig. 9 is a view looking from the right of Fig. 8.
Figure 10:
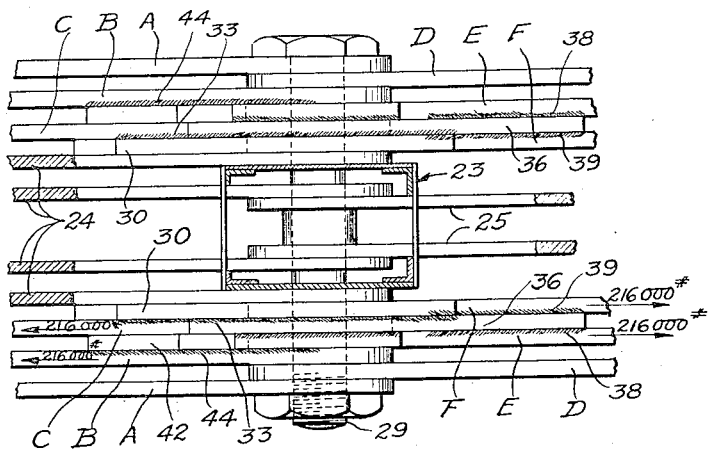
Fig. 10 is a view looking toward the bottom of Fig. 8.

The third step in the reenforcing of the joint and the bottom chord is shown in Figs. 8, 9 and 10. This comprises placing a plate 42 cut out at 43 to receive the head of eye-bar (E) between the eye-bars (B) and (C), as this plate is the same thickness as eye-bar (E) it fills the space between the eye-bars (B) and (C). The eye-bar (B) is then welded to this plate, as indicated at 44, and as the stress on the bar (B) is assumed as 216,000 pounds, it will require 36 inches of ¾ inch weld between this bar and the plate 42. As only the stress from one eye-bar is transferred to plate 42 this plate need not be over 8 inches wide at the end 45, but it is made somewhat wider than the bar (B) as indicated to accommodate the welding 44. Also because all the welding is done on the outside, this welding can be carried right up to the swelling at the head of the eye-bar as indicated.

As mentioned above, a total stress of 432,000 pounds is transferred from eye-bars (E) and (F) to the plate 36. Of this stress 216,000 pounds was then transferred to plate 30 which left an unbalanced stress of 216,000 pounds in plate 36. Now by welding plates 42 and 36 together with 36 linear inches of ¾ inch fillet weld as indicated at 46, the stress from eye-bar (B) will balance the unbalanced stress in plate 36.

It will be noticed that theoretically all the stresses from eye-bars (B) and (C) are carried through the plates 30 and 42 through plate 36 to eye-bars (E) and (F), and therefore the pin 29 only carries the stress from eye-bars (A) and (D). This is only theoretical and practical conditions will be described later.

In Figs. 11 to 16, are shown the last two steps of reenforcing the joint and bottom chord. As here shown, two additional plates 47 and 48 are added, plate 47 being cut out at 49 to embrace the head of the eye-bar (B), while the plate 48 is cut out as shown at 50 to embrace the head of the eye-bar (D). Plate 47 is of the same thickness as the eye-bar (B) and is welded to the bar (D) as indicated at 51 with sufficient ¾ inch fillet weld to carry the assumed stress in the eye-bar (D), which in this case is 216,000 pounds. As shown in Figs. 14, 15 and 16, which shows the joint completely reenforced, the plate 48 is the same thickness as the bar (D) and this plate is welded to the eye-bar (A), as indicated at 52, with 36 linear inches of ¾ inch fillet weld to take care of the 216,000 pound stress from the eye-bar (A). The two plates 47 and 48 are now welded together, as shown at 53, with 72 inches of ¾ inch fillet weld. This welding has the safe strength of 432,000 pounds, which is sufficient to transfer the stress from both the old bars (A) and (D) and the new bars 54 which are now added after these plates 47 and 48 are welded together. These bars 54 extending to the right are welded to the plate 47, as indicated at 55, and the bars 54 extending to the left are welded to the rear side of the plate 48 as indicated at 56. These bars 54 are the same thickness as the eye-bars and of a width to give the desired strength. As shown on the drawings, they are made 3 inches by 2 inches, and the plates 47 and 48 are of sufficient width to permit the necessary welding of the bars 54 to them. Also they will have to transfer 216,000 pounds from each of the two new bars 54, or that is, 432,000 pounds, and therefore the plate 47 is made 9 inches wider than the head of the eye-bar. This leaves a net cross-sectional area for plate 47 of 18 square inches over the center of the pin 29. This also provides sufficient width to permit the welding of the plate 48 to it as indicated at 53. In the mounting of the new or additional reenforcing bars 54, they are welded at one end, say for example, to the plate 47, at one joint or pin 29, and they are pre-stressed to the same unit stress as the old eye-bars under dead load by heating them to expand them to the desired length according to the method described in my prior Patent No. 1,770,932 issued July 22, 1930, and then while these bars 54 are under this stress, or that is expanded, the other end is welded to the plate 48 at the next joint or pin 29. The same procedure is used for all the new or additional bars, that is, they are all pre-stressed or expanded, as indicated in the patent noted, before they are welded at the second end. This is also true of the additional diagonals 57.

While all of the materials and welding are made to take the full dead load, live load, and impact stresses, it will not be practical to relieve present members from the dead load stresses, that is the pins 29 will always have to carry the original dead load, but it will be practical to relieve these pins by my new method and construction of the greater part of the live load and impact stresses. Similarly these pins cannot easily be relieved of the horizontal component of the diagonal stresses.

Because the welding is not stressed to its safe strength no provisions are made for the eccentricity of the stresses. All of the plates being, say 2 inches thick and welded together, will be stiff enough so it will not be necessary to do any additional welding for this condition.

It will, of course, be understood that each of the joints of the lower chord are reenforced in the same manner. It is also to be understood that the complete reenforcing of the joints as comprising the five steps described, need not necessarily be employed in each instance. Thus if only the reenforcement provided by the first two steps of Figs. 2 to 7 is required, this is all that will be added in that particular case. Similarly if the additional reenforcement of Figs. 8, 9 and 10 plus that of Figs. 2 to 7 is all that is required in another installation, then the reenforcing will stop when that has been completed, and so on depending on how much reenforcement is necessary.

In reenforcing a bridge as above described, it is advisable to secure batten plates 58, Figs. 23 to 25, across the old eye-bars and the new or additional bars 54 to prevent vibration or rattling. These may be secured in any desired manner, but preferably by welding as indicated at 59. If desired, the bars can be laced together by lattice bars 60 welded to them thus forming a single unit and which can be calculated to take care of any reversal of stresses.

It will be evident from the foregoing description that in this arrangement stress in an eye-bar at one side of a pin will be transferred to the eye-bar at the other side of the pin substantially without strain on the pin. That is, assuming a stress in the eye-bar (C), such stress will be communicated to the plate 30 and by the plate 30 to the plate 36 and by the latter plate to the eye-bar (F). This transfer of stress from one side of the pin to the other will necessarily take place without substantial strain on the pin since the plates are welded to the respective eye-bars and to one another. The individual eye-bars have only a relatively narrow surface bearing against the respective connecting pins 29 and through which in the bridges as built the entire load must be transmitted, and where bridges are forced to carry a greater load than that for which they are designed the result has been that the connecting pins have been crushed or cut into. When a bridge is reenforced by the above method it will be apparent that substantially all strain insofar as the lower bridge chord is concerned, except the dead load as above explained, is removed from the connecting pins.

It will, of course, be understood that the operation of adding the plates is repeated at each of the connecting pins 29 of the bridge. Such being the case, it is a simple matter to add additional bars to the lower chord of the bridge. Such additional or strengthening bars are shown at 54 and are preferably arranged one above and one below the bars forming the lower chord of the bridge. These strengthening bars 54 are disposed between the plates about one connecting pin and the plates about the next adjacent connecting pin and the end portions of the strengthening bars are welded to the plates, but are expanded for pre-stressing before being welded at the second end as above described. As disclosed in Figs. 11 to 16 the ends of the strengthening bars extending toward the right are welded to the plate 47, while the strengthening bars extending toward the left are welded to the plate 48. The end portions of the upper and lower additional or strengthening bars 54 are preferably welded to the respective plates at points above and below the connecting pins. This serves further to relieve said pins of strain.

In the above example I have shown how the bottom chord and joints can be strengthened where the elements are in good condition, but in some bridges the eye-bars, particularly near the hinge pin 29, are so badly corroded as to be practically worthless while the central portion of the bars, say from two or three feet away from the joint, are still in perfect condition. In Figs. 17 to 22 I have shown how my improved method can be used to return these bars to full strength or even increased strength.

In Figs. 17, 18 and 19 the eye-bars (A) and (B) are so badly corroded at the joint and extending say to line 61, due to the fact perhaps they have not been properly painted and acid water etc. is carried down into the joint. Beyond the point 61 the metal is still in perfect condition. Either one or both, if necessary, of these eye-bars can easily be returned to full strength by my method. In doing this a plate 62 similar to plate 30 is cut out on one side as 63 to engage over head of eye-bar (B). Then a second plate or bar 64 with an enlarged head portion 65 is welded to the plate 62 as at 66 and the body portion of this plate or bar is made sufficiently long so as to overlap the end of the good or sound portion 68 of the eye-bar to be strengthened. Then by welding the bar 64 to this sound portion of either bar (A) or (B) or both as indicated at 67, it will be evident the plate or bar 64 takes the place of the corroded part of the eye-bar and its full strength is carried to the joint. Before welding the bar 64 to the eye-bars it may be expanded by heat so as to be pre-stressed as indicated in my prior patent above noted.

In Figs. 20 to 22 the same method is used to tie together the eye-bars on opposite sides of the hinge pin 29 where these bars are badly corroded for their portions near the joint.

Here the plate 69 corresponding to plate 62 has an extension 70 which may be welded to the eye-bar (A) or (B) or both as indicated at 71, to the good metal beyond the point 72 where badly corroded portion ends. Either one, two or three or more of these plates may be used as indicated in Fig. 22, depending on the condition of the eye-bars (A), (B), etc., and as is found necessary. Then similar bars or plates 73 with enlarged heads 74 are welded to the enlarged heads of bars 69 as indicated at 75, and extending between the eye-bars or outside of them and welded to them as indicated at 76 beyond the point 72 and to the sound part of the bars. The heads of the bars 69 and 74 are cut out to fit over the heads of the eye-bars. These bars 70 and 73 may be pre-stressed before welding as described in my patent above mentioned. It will be evident that when these bars are in place the good portions 77 and 78 of the eye-bars are rigidly connected by good metal right across the joint and thus the eye-bars and the bridge chord are returned to full strength.

Figs. 26, 27 and 28 disclose a method of strengthening or reenforcing the lower chords of a small road bridge of light construction. In such a bridge there may be but one eye-bar extending from one connecting pin to the next and the method is disclosed in connection with such a construction. In these figures a vertical strut is indicated as at 79, a connecting pin at 80, and a pair of oppositely extending eye-bars at 81 and 82. A plate 83 having a slot 84 therein is slipped over the connecting pin 80 and then has the eye-bar 81 welded to it as at 85. When this operation is completed the head portions of the eye-bars may if desired be welded together.

When this plate 83 has been secured in position it will be understood that it is rigid with at least one of the eye-bars and it will serve to give the eye-bar an additional bearing surface on the connecting pin. Plates 83 are disposed about each of the pins 80 and disposed to extend between the adjacent plates are strengthening bars 86. These strengthening bars are preferably arranged in pairs one being disposed below each eye-bar and the other above the eye-bar. At their opposite ends the strengthening bars are welded to the adjacent portions of the plates 83 as at 87. This it will be seen provides a simple method of strengthening or reenforcing the bottom chord of a bridge by the addition of supplemental bars. The plates 83 are slipped into place without in any manner disturbing the existing connections on the bridge and it is obvious that the bars 86 may be added without removing any connections.

Figs. 29, 30 and 31 illustrate a method of reenforcing or supplementing the diagonal eye-bars of a bridge. In these figures a vertical strut is indicated at 88 and diagonal eye-bars are designated 89. These diagonal eye-bars are connected to the vertical strut as by a pin 90. In order to supplement the diagonal eye bars 89 a plate 91 having a slot 92 therein is slipped over the pin 90 at one side of each of the diagonal eye-bars and this plate directly engages the pin as does the plate 83 in Figs. 26 through 28.

After plate 91 is in place it is welded to the eye-bar 89 as at 93 whereby a substantially rigid structure is provided and whereby the bearing surface between the eye-bar and the pin 90 is increased. Next diagonal strengthening bars 94 are disposed between the plate 91 and a corresponding or other plate on the upper chord of the bridge and these strengthening bars then have their lower ends welded to plate 91 as at 95, and they may be similarly connected with the upper chord of the bridge. Preferably the bars 94 are arranged one above and one below each of the diagonal eye-bars 89 and are preferably connected with the plate 91 at points above and below the connecting pin 90.

The connecting pins 27 in the upper chord 21 of the bridge may also be relieved and to accomplish this a bracket 96 (see Figs. 32 and 33) is welded to the strut 23 at a point below the upper chord. This bracket 96 may include an upper or horizontal plate 97 and a series of vertically arranged plates 98 welded to the strut and to the upper or horizontal plate 97. Wedges 99 are driven in between the part 97 of the bracket 96 and the lower angle portion of the chord whereby to elevate the chord and relieve the pin 27. After the wedges are properly driven in place they may be welded together and are then welded to the bracket and to the upper chord whereby a rigid structure is provided.

The diagonal bars 24 may be strengthened or reenforced and to accomplish this it is preferred that a plate 100 be welded to the upper chord of the bridge about the connecting pin 27 thereof. This plate may be provided with openings to accommodate the projecting heads of rivets and the plate is welded about its edges to the chord as at 101. If desired, the openings which receive the rivet heads may be filled with welding material so as to give the plate a finished appearance. Next diagonal bars 57 may be disposed between the plates 30 and the plates 100 and the upper ends of such bars are welded to the plates 100 as at 102 and to the plates 30 as at 34.

Since through the employment of the bracket 96 and wedges 99 the strain on the pins 27 has been relieved, it will be appreciated that the additional bars 57 will not place any further strain on these pins. Further since the lower ends of these bars are welded to the plates 30, there will be no resultant strain on the connecting pins of the lower bridge chord. If desired, the diagonal eye-bars or counters 25 may be supplemented in the manner set forth for the strengthening or reenforcing of the diagonal bars 24.

From the foregoing description taken in connection with the accompanying drawings it will be apparent that I have provided a relatively simple and economical method whereby pin connected bridge trusses may be reenforced or strengthened. With this method it is not necessary to build any false work or other means to support a joint or a part of the load while the bridge is being repaired. This is due to the fact that with the present method it is not necessary to disconnect or remove any of the usual parts of the bridge structure, and the said usual parts continue in the performance of their usual functions while the bridge is being reenforced or strengthened.

The method is such that the connecting pins may be substantially relieved of their burden whereby they will not be cut or crushed. Also the method enables repairs to be made whereby the bearing surface between the pins and the eye-bars is materially increased so that the pins will not be cut into when an excessive load is placed on the bridge. In fact, according to the present method, the various parts of the bridge may be strengthened and the additional or strengthening bars which may be incorporated in the bridge are easily secured in place without the moving of any parts from the bridge and without in any way interfering with the performance by the usual bridge parts of their normal functions.

Having thus set forth the nature of my invention, what I claim is:

1. The method of reenforcing existing eye-bar structures, the same comprising attaching a plate to an end portion of an eye-bar at one side of the connecting pin for said end of the eye-bar, attaching a plate to the end of the next adjacent but oppositely extending eye-bar and at the opposite side of said pin, and then securing said plates together to relieve the connecting pin of strain.

2. The method of reenforcing existing-bar structures, the same comprising welding a plate to an end portion of an eye-bar at one side of the connecting pin for said end of the eye-bar, welding a plate to the end of the next adjacent, but oppositely extending eye-bar and at the opposite side of said pin, and then welding said plates together to relieve the connecting pin of strain.

3. The method of reenforcing existing eye-bar structures, the same comprising attaching a plate to an end portion of an eye-bar at one side of the connecting pin for said end of the eye-bar, attaching a plate to the end of the next adjacent but oppositely extending eye-bar and at the opposite side of said pin, then securing said plates together to relieve the connecting pin of strain, attaching similar plates to the eye-bars at the next adjacent connecting pins at the opposite ends of the first bars, disposing strengthening bars between the plates at one connecting pin and the plates at the other connecting pin, and securing the respective ends of said strengthening bars to the plates at the respective pins.

4. The method of reenforcing existing eye-bar structures, the same comprising welding a plate to an end portion of an eye-bar at one side of the connecting pin for said end of the eye-bar, welding a plate to the end of the next adjacent but oppositely extending eye-bar and at the opposite side of said pin, welding said plates together to relieve the connecting pin of strain, welding similar plates to the eye-bars at the next adjacent connecting pins at the opposite ends of the first bars, disposing strengthening bars between the plates at one connecting pin and the plates at the other connecting pins, arranging said bars one above and one below the eye-bar extending between said pins, and welding the respective ends of said strengthening bars to the plates at the respective pins.

5. The method of securing the eye-bars of existing eye-bar structures against rattle, said method including disposing a plate across said eye-bars at a point spaced from the connecting pin for the eye-bars, arranging said plate in engagement with the edges of said eye-bars, and then welding said plate to said eye-bars.

6. The method of reenforcing existing eye-bar structures, the same comprising welding a plate to an end portion of an eye-bar at one side of the connecting pin for said end of the eye-bar, welding a plate to the end of the next adjacent but oppositely extending eye bar and at the opposite side of said pin, welding said plates together to relieve the connecting pin of strain, disposing a plate across said eye-bars and in engagement therewith and in spaced relation to said pin, and then welding said last plate to each of said eye-bars.

7. The method of reenforcing existing eye-bar structures, the same including disposing plates about the connecting pins for the eye-bars, disposing strengthening bars between said plates, and securing the end portions of said strengthening bars to said plates at points above and below said connecting pins.

8. The method of reenforcing existing eye-bar structures, the same including disposing plates about the connecting pins between the eye-bars, welding the adjacent portions of the eye-bars to said plates, disposing strengthening bars between said plates, and welding the end portions of said strengthening bars to said plates at points above and below said connecting pins.

9. The method of reenforcing an eye-bar bridge including attaching a plate to an end portion of an eye-bar of the bottom chord of the bridge at one side of the connecting pin for said end of the eye-bar, attaching a plate to the upper chord of the bridge at a point laterally of said connecting pin, disposing a reenforcing bar diagonally between said plates, and attaching the respective ends of the reenforcing bar to the plates.

10. The method of reenforcing an eye-bar bridge including welding a plate to an end portion of an eye-bar of the bottom chord of the bridge at one side of the connecting pin for said end of the eye-bar, attaching a plate to the upper chord of the bridge at a point laterally of said connecting pin, disposing a reenforcing bar diagonally between said plates, and welding the respective ends of the said reenforcing bar to the respective plates.

11. The method of reenforcing an eye-bar bridge, the same comprising welding a plate to an end portion of an eye-bar of the bottom chord of the bridge at one side of the connecting pin for said end of the eye-bar, welding a plate to the end of the next adjacent but oppositely extending eye-bar and at the opposite side of said pin, welding said plates together to relieve the connecting pin of strain, welding a plate to the upper chord of the bridge at a point laterally of said connecting pin, disposing a bar diagonally between said upper plate and one of the plates secured to the eye bars, and then welding the respective ends of said diagonal bar to the respective plates.

12. The method of reenforcing the upper chord of a bridge, said method including welding a bracket to the vertical strut of the bridge below a connecting pin in the upper bridge chord, forcing wedges between said bracket and chord to elevate the chord and relieve said pin of stress from the strut, and then welding said wedges to the chord and bracket.

13. The method of reenforcing the upper chord of a bridge, said method including attaching a bracket to a vertical strut of the bridge below a connecting pin in the upper bridge chord, forcing wedges between said bracket and chord to elevate the chord and relieve said pin of stress from the strut, and then securing said wedges in position and to the chord and bracket.

14. The method of strengthening and relieving the diagonal eye-bars extending between the connecting pins of the upper and lower chords of a bridge, the same including disclosing a slotted plate about a connecting pin of the lower chord of the bridge, welding the lower end portion of a diagonal eye-bar of the bridge to said plate, welding a plate to the upper bridge chord at a point laterally of said connecting pin, disposing a pair of strengthening bars diagonally between said plates with said bars arranged above and below the diagonal eye-bar, and welding the respective ends of said pair of strengthening bars to said plates.

15. The method of strengthening and relieving the diagonal eye-bars extending between the connecting pins of the upper and lower chords of a bridge, the same including disposing a plate about a connecting pin of the lower chord of the bridge, securing the lower end portion of a diagonal eye-bar to the plate to relieve said connecting pin of strain, securing a plate to the upper bridge chord at a point laterally of said connecting pin, disposing a pair of strengthening bars diagonally between said plates, with said bars arranged above and below the diagonal eye-bar, and then securing the respective ends of said pair of strengthening bars to said plates.

16. The method of reenforcing existing eye-bar structures, the same comprising welding a plate to an end portion of an eye-bar at one side of the connecting pin for said end of the eye-bar, welding a plate to the end of the next adjacent but oppositely extending eye-bar and at the opposite side of said pin, welding said plates together to relieve the connecting pin of strain, welding similar plates to the eye-bars at the next adjacent connecting pins at the opposite ends of the first bars, disposing strengthening bars between the plates at one connecting pin and the plates at the other connecting pins, arranging said bars one above and one below the eye-bar extending between said pins, welding the respective ends of said strengthening bars to the plates at the respective pins, disposing a plate across said eye-bars and in engagement therewith and with one of said strengthening bars and in spaced relation to said pin, and then welding said last plate to the eye-bars and the strengthening bar.

17. The method of strengthening existing eye-bar structures, the same comprising disposing a plate about a connecting pin for eye-bars in said structure, and welding an end portion of an eye-bar to said plate with the plate in engagement with said pin whereby to increase the bearing surface between the eye-bar and pin.

18. The method of strengthening existing eye-bar structures, the same comprising disposing a plate about a connecting pin for eye-bars in said structure, welding an end portion of an eye-bar to said plate with the plate in engagement with said pin whereby to increase the bearing surface between the eye-bar and pin, repeating said operation at the next adjacent pin of the lower chord of the bridge, disposing strengthening bars between said plates, and welding the ends of said strengthening bars to the respective plates.

19. An eye-bar construction including a pair of eye-bars extending in opposite directions from a hinge pin passing through and connecting them comprising a pair of plates each cut out at one edge to fit and disposed over and bearing against the head of one of said bars and secured to the oppositely extending bar, and means connecting the plates.

20. An eye-bar construction including eye-bars extending in opposite directions from a hinge pin passing through and connecting them comprising a plate having a recess at one edge receiving the head of an eye-bar, said plate secured to an eye-bar extending in the opposite direction from the first eye-bar, a similar plate having a recess receiving the head of the second eye-bar and secured to the first eye-bar, and a connection between the plates.

21. An eye-bar construction including a plurality of eye-bars extending from a hinge pin and on opposite sides thereof, comprising plates located between the bars on opposite sides of the pin and each welded to an adjacent bar, and said plates on opposite sides of the pin overlapping each other and secured together.

22. An eye-bar construction including eye-bars extending in opposite directions from a hinge pin connecting them comprising plates wider than the bars, one plate having a recess in one edge receiving the head of a bar and welded to the edges of a bar extending in the opposite direction from the pin, a similar plate having a recess receiving the head of the second bar and welded to the edges of the first bar, said plates overlapping each other and welded together along their edges.

ARTHUR G. LEAKE.